United States Patent [19]

Huckestein et al.

[11] Patent Number: 5,780,542

[45] Date of Patent: Jul. 14, 1998

[54] WATER-EMULSIFIABLE POLYISOCYANATES

[75] Inventors: Brigitta Huckestein, Schifferstadt; Hans Renz, Meckenheim; Stephan Kothrade, Limburgerhof; Karl Häberle, Speyer, all of Germany

[73] Assignee: BASF Aktiengesellschaft, Ludwigshafen, Germany

[21] Appl. No.: 679,112

[22] Filed: Jul. 12, 1996

[30] Foreign Application Priority Data

Jul. 18, 1995 [DE] Germany ............... 195 26 079.1

[51] Int. Cl.$^6$ ............... C08J 83/00; C08J 75/00; C08F 283/04

[52] U.S. Cl. ............... 524/590; 524/590; 524/591; 524/839; 525/458

[58] Field of Search ............... 525/458; 524/590, 524/591, 839; 260/88.3

[56] References Cited

U.S. PATENT DOCUMENTS

| | | | |
|---|---|---|---|
| 3,216,983 | 11/1965 | Shelanski et al. | 260/88.3 |
| 4,260,532 | 4/1981 | Reuther et al. | 260/29.6 |
| 4,812,368 | 3/1989 | Scherzer et al. | 428/332 |
| 5,177,141 | 1/1993 | Thoma et al. | 524/591 |
| 5,283,298 | 2/1994 | Sarpeshkar et al. | 525/458 |

FOREIGN PATENT DOCUMENTS

| | | |
|---|---|---|
| 0 007 532 | 2/1980 | European Pat. Off. . |
| 0 276 465 | 8/1988 | European Pat. Off. . |
| 0 310 345 | 4/1989 | European Pat. Off. . |

*Primary Examiner*—Johann Richter
*Assistant Examiner*—Joseph Murray
*Attorney, Agent, or Firm*—Oblon, Spivak, McClelland, Maier & Neustadt, P.C.

[57] ABSTRACT

Water-emulsifiable polyisocyanates containing a) aliphatic, cycloaliphatic and aromatic polyisocyanates and b) reaction products of the abovementioned polyisocyanates with polyvinylpyrrolidones which have at least one group which is reactive with isocyanate.

5 Claims, No Drawings

WATER-EMULSIFIABLE POLYISOCYANATES

The present invention relates to water-emulsifiable polyisocyanates containing
a) aliphatic, cycloaliphatic and aromatic polyisocyanates and
b) reaction products of the abovementioned polyisocyanates with polyvinylpyrrolidones which have at least one group which is reactive with isocyanate.

The present invention furthermore relates to the use of the water-emulsifiable polyisocyanates as additives for aqueous dispersions, in particular for adhesives, coating materials or impregnating materials.

The performance characteristics of aqueous polymer dispersions can be improved by the addition of polyisocyanates.

Polyisocyanates which have been rendered hydrophilic and are water-emulsifiable have proven suitable for this purpose.

For example, polyisocyanates which have been rendered hydrophilic by means of chemically bonded carboxyl groups, as described, for example, in DE-A-41 42 275, are used. However, the disadvantage here is that the carboxyl-containing polyisocyanates are not compatible with cationic binders having a pH of less than about 5.

EP-A-7532 discloses the use of polyvinylpyrrolidones as emulsifiers for polyisocyanates. Thorough stirring is required for emulsifying the polyisocyanates.

Furthermore, the carboxyl-containing polyisocyanates have a sufficient shelf life only when they are stored in the unneutralized state, because the carboxylic acids neutralized with the tertiary amines are effective catalysts for the trimerization of NCO groups. The user is therefore forced to carry out the neutralization immediately before the emulsification, which constitutes a further process step.

Polyisocyanates rendered hydrophilic with polyethylene oxide-containing alcohols are disclosed, for example, in EP-A-206059.

A basic disadvantage of these polyisocyanates is that the coatings cure relatively slowly. However, more rapid curing is desirable since this makes it possible to increase the cycle time of the coating lines. In addition, the performance characteristics of the coatings obtained are still worth improving, especially with regard to the adhesion to metal.

It is an object of the present invention to provide a water-emulsifiable polyisocyanate which ensures faster curing. The performance characteristics of the aqueous dispersions which contain the water-emulsifiable polyisocyanates and of the coatings, impregnations or adhesive bonds produced therewith should be comparable or better compared with the known water-emulsifiable polyisocyanates, and in particular the adhesion to metal should be improved.

In the water-emulsifiable polyisocyanates, the polyisocyanates a) used under b) may be identical to or different from those under a).

Examples of polyisocyanates are conventional diisocyanates and/or conventional polyisocyanates of higher functionality, having an average NCO functionality of from 2.0 to 4.5. These components may be present alone or as a mixture.

Examples of conventional diisocyanates are aliphatic diisocyanates, such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, trimethylhexane diisocyanate or tetramethylhexane diisocyanate, cycloaliphatic diisocyanates, such as 1,4-, 1,3- or 1,2-diisocyanatocyclohexane, 4,4'-di(isocyanatocycnohexyl)methane, 1-isocyanato-3,3,5-trimethyl-5-(isocyanatomethyl)cyclohexane (isophorone diisocyanate) or 2,4- or 2,6-diisocyanato-1-methylcyclohexane, and aromatic diisocyanates, such as toluylene 2,4- or 2,6-diisocyanate, tetramethylxylylene diisocyanate, xylylene diisocyanate, 2,4'- or 4,4'-diisocyanatodiphenylmethane, phenyl 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethylbiphenyl, 3-methyldiphenylmethane 4,4'-diisocyanate or 4,4'-diisocyanatodiphenyl ether. Mixtures of the stated diisocyanates may also be present. Hexamethylene diisocyanate and isophorone diisocyanate are preferred.

Examples of suitable conventional polyisocyanates of higher functionality are triisocyanates, such as 2,4,6-triisocyanatotoluene or 2,4,4'-triisocyanatodiphenyl ether, or the mixtures of di-, tri- and higher polyisocyanates, which are obtained by phosgenation of corresponding aniline/formaldehyde condensates and constitute polyphenyl polyisocyanates having methylene bridges.

Of particular interest are conventional aliphatic polyisocyanates of higher functionality, belonging to the following groups:

(a) Isocyanurate-containing polyisocyanates of aliphatic and/or cycloaliphatic diisocyanates. The corresponding isocyanatoisocyanurates based on hexamethylene diisocyanate and isophorone diisocyanate are particularly preferred here. The present isocyanurates are in particular simple trisisocyanatoalkyl or trisisocyanatocycloalkyl isocyanurates, which constitute cyclic trimers of the diisocyanates, or mixtures with their higher homologues having more than one isocyanurate ring. The isocyanatoisocyanurates have in general an NCO content of from 10 to 30, in particular from 15 to 25, % by weight and an average NCO functionality of from 2.6 to 4.5.

(b) Uretdione diisocyanates having aliphatically and/or cycloaliphatically bonded isocyanate groups, preferably derived from hexamethylene diisocyanate or isophorone diisocyanate. Uretdione diisocyanates are cyclic dimerization products of diisocyanates.

(c) Biuret-containing polyisocyanates having aliphatically bonded isocyanate groups, in particular tris(6-isocyanatohexyl)-biuret or its mixtures with its higher homologues, and biurets derived from isophorone diisocyanate. These biuret-containing polyisocyanates have in general an NCO content of from 10 to 30, in particular from 18 to 25, % by weight and an average NCO functionality of from 3 to 4.5.

(d) Urethane- and/or allophanate-containing polyisocyanates having aliphatically or cycloaliphatically bonded isocyanate groups, as can be obtained, for example, by reacting excess amounts of hexamethylene diisocyanate or of isophorone diisocyanate with simple polyhydric alcohols, such as trimethylolpropane, glycerol, 1,2-dihydroxypropane or mixtures thereof. These urethane- and/or allophanate-containing polyisocyanates have in general an NCO content of from 12 to 20% by weight and an average NCO functionality of from 2.0 to 3.

(e) Oxadiazinetrione-containing polyisocyanates, preferably derived from hexamethylene diisocyanate or isophorone diisocyanate. Such oxadiazinetrione-containing polyisocyanates can be prepared from diisocyanate and carbon dioxide.

(f) Uretonimine-modified polyisocyanates.

Aliphatic and cycloaliphatic polyisocyanates are particularly preferred. Hexamethylene diisocyanate and isophorone diisocyanate are very particularly preferred, especially the isocyanurates and biurets thereof.

The preparation of the reaction products b), the polyisocyanates defined above are reacted with polyvinylpyrrolidones.

The polyvinylpyrrolidones are in particular those having a number average molecular weight of from 400 to 40000, particularly preferably from 500 to 8000, g/mol.

The molecular weight is determined, for example, by gel permeation chromatography. In particular, the molecular weight may also be obtained by terminal group determination if the number of functional groups per polymer molecule is known, as is the case, for example, in the preparation described below. In addition to vinylpyrrolidone, the polyvinylpyrrolidones may also contain other ethylenically unsaturated monomers as components. However, the amount of such monomers is in general less than 30, preferably less than 10, particularly preferably less than 5, very particularly preferably 0, % by weight.

The polyvinylpyrrolidones contain at least one group which is reactive with isocyanate, this being in particular primary or secondary amino or particularly preferably hydroxyl.

The polyvinylpyrrolidones preferably contain on average from one to two groups in the molecule which are reactive with isocyanate (ie. their functionality is from 1 to 2).

Their functionality is particularly preferably from 1 to 1.2. Very particularly preferably, the polyvinylpyrrolidones contain on average one group which is reactive with isocyanate, in particular one hydroxyl group in the molecule (functionality 1).

The groups which are reactive toward isocyanate are preferably bonded as terminal groups in the polymer chains of the polyvinylpyrrolidone.

The groups which are reactive toward isocyanate can be introduced into the molecule, for example, by using special initiators or regulators in the polymerization of N-vinylpyrrolidone. F. Haaf, A. Sammer and F. Straub, Polymer Journal 17 (1985) 143–152, describe, for example, the polymerization of N-vinylpyrrolidone in water with $H_2O_2$ as an initiator, exactly one terminal hydroxyl group being present in each polyvinylpyrrolidone molecule formed. The desired molecular weight is established by the concentration of $H_2O_2$.

The reaction products b) can be prepared by reacting the NCO groups of the starting polyisocyanate and the NCO-reactive groups of the polyvinylpyrrolidones in equivalent amounts and mixing the resulting, essentially NCO-free product with the same or different polyisocyanates a).

The preparation can also be carried out by reacting the polyvinylpyrrolidones with excess starting polyisocyanate and thus obtaining a mixture a)+b) directly.

The polyvinylpyrrolidones are used in amounts such that the water-emulsifiable polyisocyanate preferably has a polyvinylpyrrolidone content of from 1 to 20, particularly preferably from 5 to 18, % by weight, based on the sum a)+b). If other hydrophilic groups are present, their content is in particular not more than 15% by weight, based on the water-emulsifiable polyisocyanate, of ethylene oxide units or not more than 2 mol, based on 1 kg of water-emulsifiable polyisocyanate, of carboxyl or sulfonate groups chemically bonded to the isocyanate. However, the presence of other hydrophilic groups is not necessary.

The reaction of the polyvinylpyrrolidones with the polyisocyanates is preferably carried out at from 20° to 150° C., in the presence or absence of conventional catalysts, eg. dibutyltin dilaurate or diazabicyclooctane.

It may be advantageous to use solvents inert to NCO, such as hydrocarbons, ketones, esters, amides or suitable lactams, in the synthesis.

The water-emulsifiable polyisocyanates are suitable as additives, ie. as crosslinking agents, for aqueous polymer dispersions, in particular for dispersions of polyurethanes or polymers obtained by free radical polymerization. They are particularly suitable as additives for adhesives, coating materials or impregnating materials based on aqueous dispersions of, in particular, polyurethanes or polymers obtained by free radical polymerization.

The water-emulsifiable polyisocyanates are spontaneously emulsifiable in water.

The aqueous dispersions have a higher curing rate than aqueous dispersions which contain water-emulsifiable polyisocyanates with ethylene oxide units.

They may also be used alone, for example for finishing textiles (cf. for example German Patent Application P 44 15 451.8).

The impregnating materials, coating materials and adhesives obtained have only an insignificantly greater hydrophilic character.

EXAMPLES

Polyisocyanate PI 1

Polyisocyanate which is prepared by trimerizing some of the isocyanate groups of 1,6-diisocyanatohexane, has isocyanurate groups and essentially comprises tris(6-isocyanatohexyl) isocyanurate, having an NCO content of 22.2%, a monomeric diisocyanate content of less than 0.3%, a viscosity of 1.9 Pa.s at 23° C. and an average NCO functionality of about 3.3.

Polyisocyanate PI 2

Biuret polyisocyanate which is based on 1,6-diisocyanatohexane and essentially comprises N,N',N"-tris (6-isocyanatohexyl)biuret and its higher homologues, having an NCO content of 21.9%, a monomeric diisocyanate content of less than 0.3%, a viscosity of 2.1 Pa.s at 23° C. and an average NCO functionality of about 3.3.

Polyvinylpyrrolidone (PVP)

The polyvinylpyrrolidone used carried 1 terminal OH group per polymer chain (OH functionality 1) and had an OH number of 60 mg KOH/g.

Water-emulsifiable polyisocyanates

Example 1

A solution of 6 parts of PVP in 10 parts of propylene carbonate (PC) is added to 37 parts of PI 1 (HDI isocyanurate), and the mixture is stirred for 150 minutes at 100° C.

A clear, yellowish resin which has a polyvinylpyrrolidone content of 11.3% by weight, a PC content of 18.9% by weight and an NCO content of 15.0% by weight and is readily emulsifiable in water is obtained.

Example 2

The procedure is similar to that in Example 1, with the use of PI 2. A clear, yellowish resin which has a PVP content of 11.3% by weight, a PC content of 18.9% by weight and an NCO content of 15.0% by weight and is readily emulsifiable in water is obtained.

Comparative Example (according to EP 206 059)

37 parts of PI 1 are stirred with 6 parts of a polyethylene oxide initiated on methanol having a terminal OH group and a molecular weight of 1100 g/mol, and with 10 parts of PC, at 100° C. for 150 minutes.

A clear, yellowish resin which has a polyethylene oxide content of 11.3% by weight, a PC content of 18.9% by weight and an NCO content of 15.1% by weight and is readily emulsifiable in water is obtained.

Testing of performance characteristics

Basic formulation (parts are by weight)

89.6 parts of an aqueous acrylate dispersion having a solids content of 45% by weight, a minimum film formation temperature of 55° C. and a hydroxyl group content of 2.4% by weight are brought to a pH of 6.8 with triethanolamine.

For this purpose, 11 parts of a mixture of butyl acetate and butyl diglycol acetate (7/3) and 10 parts of water are added.

Finally, 8 parts of the novel polyisocyanates or of the polyisocyanates of the comparative example are stirred in.

The dispersions are applied to steel sheets by means of a film drawing frame to give films, which are dried at 60° C. (dry thickness about 45 μm) for 30 min.

The increase in the pendulum hardness (according to König, DIN 53157) with time is then monitored, and an adhesion test is carried out (crosshatch test according to DIN 53151).

| Time (days) | Example | 0 | 1 | 4 | 5 | 6 | 7 |
|---|---|---|---|---|---|---|---|
| Pendulum hardness (oscillations) | 1 | 79 | 84 | 105 | 109 | 108 | 109 |
| | 2 | 77 | 81 | 103 | 105 | 105 | 105 |
| | Comparison | 50 | 58 | 72 | 76 | 82 | 88 |

In the crosshatch test, ratings from 0 (very good adhesion) to 6 (very poor adhesion) are rewarded:

| Example | Rating |
|---|---|
| 1 | 0 |
| 2 | 0 |
| Comparison | 2 |

We claim:

1. A non-emulsified water-emulsifiable polyisocyanate composition, spontaneously emulsifiable in water, comprising:
   a) an aliphatic, cycloaliphatic or aromatic polyisocyanate and
   b) a reaction product of the above mentioned polyisocyanate with a polyvinylpyrrolidone which has 1 to 2 functional groups which are reactive with isocyanate, prepared by reacting an isocyanate group of the polyisocyanate with an isocyanate reactive functional group of the polyvinylpyrrolidone in the presence of a solvent inert to NCO or in the absence of a solvent, an isocyanate reactive functional group of the polyvinyl pyrrolidone being a primary or secondary amino group or a hydroxyl group, the reaction product (b) being present in the composition in an amount such that the polyvinylpyrrolidone content is from 1 to 20% by weight based on (a) and (b).

2. A water-emulsifiable polyisocyanate composition as claimed in claim 1, wherein the polyvinylpyrrolidone is a polyvinylpyrrolidone having a number average molecular weight of from 400 to 40000.

3. A water-emulsifiable polyisocyanate composition as claimed in claim 1, wherein the polyvinylpyrrolidone has at least one hydroxyl group as the functional group which is reactive with isocyanate.

4. An aqueous dispersion of a polyurethane or a polymer obtained by a free radical polymerization, containing as an additive an emulsified water-emulsifiable polyisocyanate composition as claimed in claim 1.

5. An adhesive, coating material or impregnating material based on an aqueous dispersion containing as an additive an emulsified water-emulsifiable polyisocyanate composition as claimed in claim 1.

* * * * *